(12) United States Patent
Leblans et al.

(10) Patent No.: US 7,227,167 B2
(45) Date of Patent: Jun. 5, 2007

(54) SYSTEM COMPRISING A SCANNER AND A MEMORY LAYER, AND A MEMORY LAYER FOR STORING X-RAY INFORMATION ITEMS

(75) Inventors: Paul Leblans, Kontich (BE); Robert Fasbender, Ottobrunn (DE); Magath Niang, Munich (DE); Clemens Herrmann, Munich (DE); Rudy Van den Bergh, Lint (BE)

(73) Assignee: Agfa-Gevaert HealthCare GmbH, Leverkusen (DE)

( * ) Notice: Subject to any disclaimer, the term of this patent is extended or adjusted under 35 U.S.C. 154(b) by 162 days.

(21) Appl. No.: 10/882,822

(22) Filed: Jul. 1, 2004

(65) Prior Publication Data

US 2005/0001181 A1    Jan. 6, 2005

(30) Foreign Application Priority Data

Jul. 2, 2003    (EP)    ................................ 03101977

(51) Int. Cl.
G03B 42/08    (2006.01)
(52) U.S. Cl. ..................................... 250/584
(58) Field of Classification Search ................. 250/584
See application file for complete search history.

(56) References Cited

U.S. PATENT DOCUMENTS

| | | | |
|---|---|---|---|
| 4,362,944 A * | 12/1982 | Suzuki et al. | 250/483.1 |
| 4,675,271 A | 6/1987 | Degenhardt | |
| 5,569,926 A | 10/1996 | Leblans et al. | |
| 5,630,963 A | 5/1997 | Leblans et al. | |
| 5,632,930 A | 5/1997 | Leblans et al. | |
| 5,736,069 A | 4/1998 | Willems et al. | |
| 5,905,014 A | 5/1999 | Van de Bergh | |
| 6,228,286 B1 | 5/2001 | Leblans et al. | |

(Continued)

FOREIGN PATENT DOCUMENTS

DE    28 07 398 A1    8/1979

(Continued)

OTHER PUBLICATIONS

Examination Report from European Application No. 03 101 977.1-2217, filed on Jul. 2, 2003.

*Primary Examiner*—David Porta
*Assistant Examiner*—Christopher Webb
(74) *Attorney, Agent, or Firm*—Houston Eliseeva LLP

(57) ABSTRACT

The invention relates to a system having a scanner and a memory layer. The memory layer comprises particles for storing X-ray information items, that can be excited by a stimulating radiation to emit an emission radiation corresponding to one of the X-ray information items and that are embedded in a medium and are distributed over the entire thickness of the memory layer. The scanner comprises an irradiating device for irradiating a linear region on the memory layer and a detector for the positionally resolved detection of emission radiation emitted by the memory layer along the linear region. To increase the sharpness of the X-ray information items to be detected with low losses in the intensity of the emission radiation, the medium can at least partially absorb components, directed both perpendicularly and parallel to the plane of the memory layer, of the emission radiation emitted by the individual particles.

30 Claims, 2 Drawing Sheets

U.S. PATENT DOCUMENTS

| | | |
|---|---|---|
| 6,271,528 B1 | 8/2001 | Struye et al. |
| 6,369,402 B1 | 4/2002 | Gebele et al. |
| 6,392,249 B1 | 5/2002 | Struye et al. |
| 6,420,724 B1 | 7/2002 | Struye et al. |
| 6,476,406 B1 | 11/2002 | Struye et al. |
| 6,528,812 B1* | 3/2003 | Leblans et al. ............. 250/588 |
| 6,583,434 B2 | 6/2003 | Struye et al. |
| 6,624,437 B2* | 9/2003 | Kohda ........................ 250/584 |
| 6,642,650 B1 | 11/2003 | Struye et al. |
| 6,800,870 B2* | 10/2004 | Sayag ........................ 250/584 |
| 2002/0185620 A1* | 12/2002 | Akimoto et al. ............ 250/585 |
| 2004/0041099 A1* | 3/2004 | Gebele et al. ........... 250/484.4 |

FOREIGN PATENT DOCUMENTS

| | | |
|---|---|---|
| EP | 0 165 340 A1 | 12/1985 |
| EP | 0 595 733 A2 | 5/1994 |
| EP | 0 964 269 A2 | 12/1999 |
| EP | 1 271 558 A2 | 1/2003 |
| EP | 03 10 1977 | 12/2003 |
| WO | WO 248739 A2 * | 6/2002 |

* cited by examiner

SYSTEM COMPRISING A SCANNER AND A MEMORY LAYER, AND A MEMORY LAYER FOR STORING X-RAY INFORMATION ITEMS

FIELD OF THE INVENTION

The invention relates to a system comprising a scanner and a memory layer and also to a memory layer for storing X-ray information items.

BACKGROUND OF THE INVENTION

Systems or memory layers of the generic type are used, in particular, for medical purposes, in the computer radiography (CR) sector. In them, X-ray images are recorded in a phosphor layer by storing the X-ray radiation passing through an object, for example a patient, as a latent image in the phosphor layer. To read out the stored image, the phosphor layer is irradiated with stimulating light, as a result of which the latter emits, in accordance with the latent image, emission light that is detected by an optical detector and is converted into electrical signals. If required, the electrical signals can be processed further and displayed on a monitor or be outputted on a suitable output appliance, such as, for example, a printer.

In the prior art, systems are known in which the X-ray information items stored in a memory layer are read out with a line scanner. The line scanner comprises an irradiating device for irradiating a linear region of the memory layer with stimulating radiation and a line-shaped detector for positionally resolved detection of the emission radiation excited in the linear region of the memory layer. The memory layer has a multiplicity of individual phosphor particles in which the X-ray information items are stored. The phosphor particles are present in the form of a powder and are embedded in a medium, in particular a plastic. Memory layers of this type are therefore also described as powder image plates (PIPs). As a result of this composition and structure, the stimulating radiation incident on a memory layer is scattered in the memory layer so that not only the primarily to be excited linear region, but also adjacent regions of the layer are excited to emit emission light. The linear region to be read out cannot be sharply limited, which results in a reduction in the sharpness of the image information to be detected.

To reduce this loss of sharpness, memory layers that contain a blue dye were proposed in the prior art. The blue dye partially absorbs the stimulating radiation, which is generally in the red spectral range, in the memory layer and therefore shortens the mean path length that the stimulating radiation traverses in the memory layer. In this way, the linear region to be excited can be better limited on the memory layer thereby increasing the sharpness of the image information items to be read out. However, the absorption of the stimulating radiation simultaneously prevents a deep penetration of the stimulating radiation into the memory layer with the result that only upper sublayers of the memory layer can be excited to emit emission light. Owing to this reduced reading-out depth, the intensity of the emission radiation emitted is reduced, which results in increased signal-to-noise. Despite improved image sharpness, this does not altogether significantly improve the image information.

In addition, the blue dye in the memory layer results only in an increase in the sharpness perpendicular to the extension of the excited linear region on the memory layer. Since the total linear region is irradiated with stimulating radiation, on the other hand, no increase in sharpness is possible in the direction of said region.

SUMMARY OF THE INVENTION

It is an object of the invention to provide a system having a scanner and a memory layer and also a memory layer for storing X-ray information items, which system or which memory layer ensures an increase in the sharpness of the image information items accompanied by the lowest possible losses in the intensity of the emission light.

This object is achieved by the present invention in that the medium in which the particles designed to store the X-ray information items are embedded can at least partially absorb components of the emission radiation that are directed both perpendicularly and parallel to the plane of the memory layer and that is emitted by the individual particles.

The invention is based on the idea of coloring the medium in such a way that the emission radiation emitted by individual particles and possibly scattered at further particles is partially absorbed and thereby attenuated. Since the individual particles are surrounded by the absorbing medium, the emission radiation is attenuated in all spatial directions and its scattering correspondingly reduced. In contrast to the attenuation, known from the prior art, of the stimulating radiation, the attenuation according to the invention of the emission radiation increases the image sharpness not only perpendicularly to the direction of the excited linear region on the memory layer, but also in the direction of the excited linear region. In the case of a positionally resolved detection of the emission radiation emitted by the linear region with a line detector, an increased sharpness of the image information is therefore also detected in the line direction of the line detector. As experiments have shown, the intensity loss caused by the partial absorption of emission radiation in the memory layer under these circumstances is surprisingly so small in the case of the detected emission radiation that the signal-to-noise is not significantly increased. This result contrasts with the expectations of the person skilled in the art, according to which a partial absorption of the emission radiation in the medium of the memory layer would result in a marked attenuation of the generally very weak intensity of the emission radiation and consequently in a significantly higher signal-to-noise.

An improved sharpness of the image information items, in particular in the direction of the linear region to be read out, is achieved in the case of the system according to the invention or the memory layer according to the invention, accompanied by simultaneously high intensity of the emission radiation to be detected.

A preferred design provides that the medium can at least partially absorb the component of the emission radiation in a first wavelength range that lies in the blue-light range, in particular between 400 nm and 440 nm. This achieves the result that all the essential spectral components of the emission radiation emitted in the case of standard particle compositions, such as, for example, phosphor particles based on $BaFbr_xI_{x-1}$:Eu, are particularly reliably attenuated in order to ensure a sufficiently high gain in sharpness.

Preferably, the medium contains a first dye that can at least partially absorb the components of the emission radiation in the first wavelength range. In particular, the first dye exhibits a high absorption for the emission radiation and a low absorption for the stimulating radiation. On the one hand, this reliably reduces scattering of the excited emission radiation, while, on the other hand, it makes possible scattering of the stimulating radiation. The latter results in an increased read-out depth and consequently in higher intensities of the emission light to be detected. This achieves an improved sharpness of the image information items in the direction of the line scanner accompanied simultaneously by high emission intensity.

Preferably, the medium contains the first dye in the form of red colored pigments. These may be blended with the phosphor particles originally present in the form of a powder and easily introduced into the medium. This ensures a uniform distribution of the first dye in the medium and, consequently, a reliable absorption of emission radiation in all spatial directions.

A further embodiment of the invention provides that the medium can at least partially absorb components, directed both perpendicularly and parallel to the plane of the memory layer, of the stimulating radiation in a second wavelength range in which the particles can be excited to emit emission radiation. This embodiment is based on the idea that, in addition to the emission radiation, components of the stimulating radiation are also at least partially absorbed in order to reduce not only the scattering of the emission radiation, but also the scattering of the stimulating radiation in the memory layer. This additionally increases the sharpness of the image information to be detected. During read-out by means of a line scanner, the sharpness is increased under these circumstances perpendicular to the direction of the illuminated linear region on the memory plate. Together with the absorption according to the invention of the emission light, this achieves, all in all, an increase in sharpness both perpendicularly to the direction and in the direction of the linear region of the memory layer to be read out.

Preferably, the second wavelength range lies in the red-light range, in particular between 620 nm and 690 nm. This ensures that all the essential spectral components of the stimulating radiation that can excite the phosphor particles to emit emission light are sufficiently attenuated.

In addition, it is preferred that the medium contains a second dye that can at least partially absorb the components of the stimulating radiation in the second wavelength range. In particular, the second dye exhibits a high absorption for the stimulating radiation and a low absorption for the emission radiation. The second dye in the medium achieves the result that the reduction in the scattering of the stimulating radiation can be established regardless of the reduction according to the invention in the scattering of the emission radiation.

Analogously to the first dye, it is preferable that the medium contains the second dye in the form of blue colored pigments. In this case, too, the blue colored pigments can be blended with the phosphor particles and thereby easily introduced into the medium.

A further preferred refinement of the system according to the invention provides that the irradiating device comprises a plurality of individual radiation sources and a focusing device. The individual radiation sources each emit divergent stimulating radiation beams that are focused by the focusing device on the linear region of the memory layer in such a way that they are at least partially superimposed in the direction of the linear region. This achieves a high degree of homogeneity in the intensity of the stimulating radiation along the linear region. In addition, the superimposition of the respective stimulating radiation beams ensures that, in the event of failure of an individual radiation source, the portion of the linear region to be illuminated is illuminated by adjacent radiation sources and can be excited.

Preferably, the focusing device comprises at least one cylindrical lens or one cylindrical mirror. This ensures a relatively sharply limited focusing of the stimulating radiation beams emitted by each of the individual radiation sources on the linear region of the memory layer. This can keep any sharpness losses due to optical imaging aberrations low.

A further preferred refinement of the system according to the invention provides that the detector comprises a multiplicity of photosensitive detector elements disposed along a line. This readily makes possible a positionally resolved detection of the emission radiation emitted by the memory layer along the linear region.

Preferably, an imaging device is provided that images the emission radiation leaving the linear region in the memory layer on the detector. This results in a clear assignment of subregions emitting emission radiation on the memory layer to corresponding regions, in particular individual photosensitive detector elements, on the detector.

A preferred refinement provides that the imaging device comprises a multiplicity of microlenses disposed in a row. This keeps imaging aberrations low and simultaneously makes possible short spacings between the memory layer and the detector so that intensity losses can be kept very low.

A further preferred development of the invention provides that the irradiating device is disposed ahead of the detector with respect to a transport direction in which the scanner is moved relative to the memory layer. The scanner is accordingly moved relative to the memory layer with the irradiating device in front. This achieves the result that much of the stimulating radiation scattered in the memory layer is scattered in a direction that is directed oppositely to the transport direction. The stimulating radiation is therefore scattered predominantly into regions of the memory layer that have already been excited to emit emission radiation in preceding read-out operations. Since, as a result, only a small proportion of the stimulating radiation scattered in the memory layer is scattered into regions not yet read out, intensity losses and sharpness losses are reduced further.

BRIEF DESCRIPTION OF THE DRAWINGS

The invention is explained in greater detail below by reference to figures.

In the figures.

DETAILED DESCRIPTION OF THE INVENTION

Figure 1:
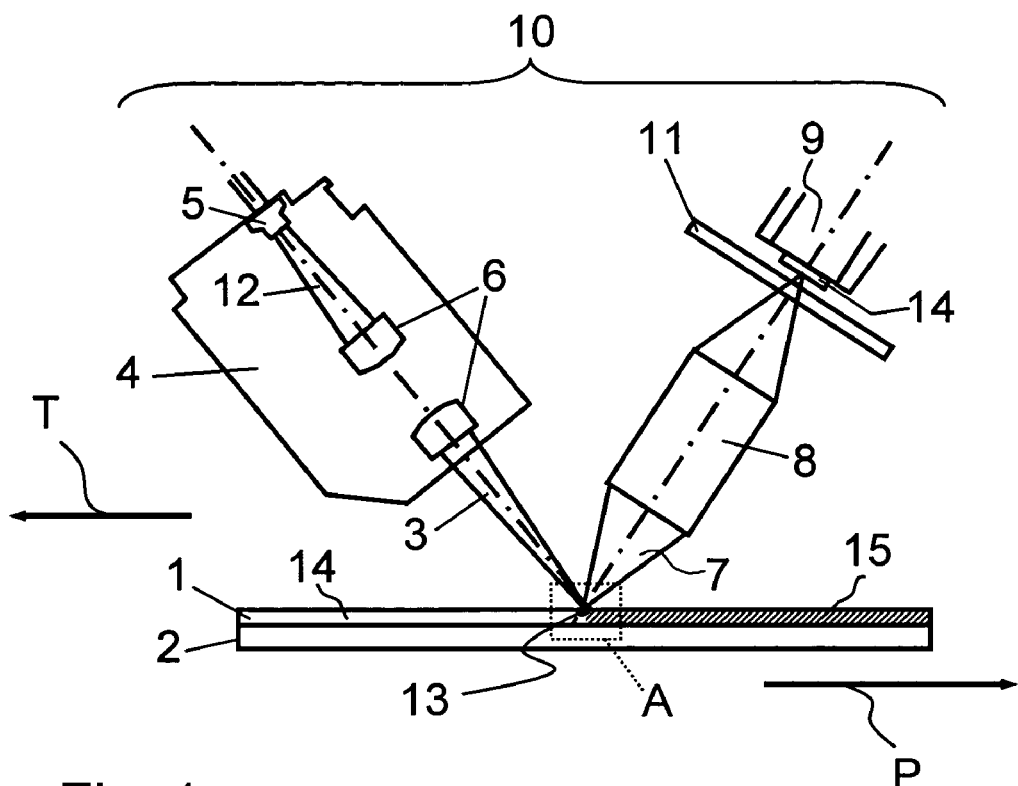
FIG. 1 shows a system according to the invention comprising a scanner and a memory layer.

FIG. 1 shows a system according to the invention comprising a scanner 10 and a memory layer 1. The memory layer 1 to be read out is situated on a base layer 2 and is irradiated with stimulating radiation 3 that is generated by an irradiating device 4. The emission radiation 7 excited in the memory layer 1 by the stimulating radiation 3 is detected by a detector 9. The irradiating device 4 and the detector 9, including an imaging device 8 and an optical filter 11, together form the scanner, which is moved relative to the memory layer 1 in the transport direction T during the read-out operation.

The irradiating device 4 comprises a plurality of individual radiation sources 5 and a focusing device 6 that focuses the stimulating radiation beams 12 leaving the radiation sources 5 on the memory layer 1. The individual radiation sources 5—for example, light-emitting diodes or laser diodes—are disposed in a row extending perpendicularly to the plane of the figure. The focusing device 6 comprises two elongated cylindrical lenses that extend essentially parallel to the individual radiation sources 5 disposed in a row. The divergent stimulating radiation beams 12 leaving the individual radiation sources 5 are focused in the plane of the figure by the focusing device 6 and are incident on the memory layer 1 as a convergent radiation beam of the stimulating radiation 3. Perpendicularly to the plane of the figure, the divergent stimulating radiation beams 12 of the individual radiation sources 5 are superimposed in such a way that the convergent radiation beam describes a continuous stimulating radiation line 13 extending perpendicularly to the plane of the figure on the memory layer 1.

The emission radiation 7 excited in the region of the stimulating radiation line 13 in the memory layer 1 and radiated is detected in a positionally resolved way by a detector 9. For this purpose, the detector 9 has a multiplicity of photosensitive detector elements 14 that are disposed along a row extending perpendicularly to the plane of the figure. The emission radiation 7 emitted in the region of the stimulating radiation line 13 on the memory layer 1 is imaged by means of an imaging device 8 on the photosensitive detector elements 14 of the detector 9. The detector 9 is preferably designed as a row of CCDs or photodiodes. Suitable as imaging device 8 are preferably microlenses that are disposed along a row extending perpendicularly to the plane of FIG. 1—and consequently parallel to the detector 9 constructed in the form of a row. Also suitable as an imaging device are gradient-index lenses, in particular self-focusing lenses, that are likewise disposed in a row extending perpendicularly to the plane of FIG. 1.

Optionally, an optical filter 11 that is transparent in the wavelength range of the emission radiation 7 and is essentially opaque in the wavelength range of the stimulating radiation can be provided in the beam path between the memory layer 1 and the detectors 9. This ensures that the detection of the emission radiation is not falsified by components of the stimulating radiation that are reflected at the memory layer 1 and can reach the detector 9.

In the exemplary embodiment shown, the scanner 10 is moved by a transport mechanism that is not shown in the transport direction T over the stationary memory layer 1, in which process the stimulating radiation line 13 successively excites different linear regions of the memory layer 1 and the emission radiation 7 emitted in each case is detected in a positionally resolved way. In this connection, the irradiating device 4 is arranged ahead of the detector 9 with respect to the transport direction T, i.e. the scanner 10 travels across the memory layer 1 with the irradiating device 4 in front. This achieves the result that much of the stimulating radiation 3 scattered in the memory layer is scattered into regions 15 that have already been read out and only a small part is scattered into regions 14 of the memory layer that have not yet been read out. In the system according to the invention, this can additionally reduce intensity losses and sharpness losses due to scattering of stimulating radiation 3 inside the memory layer 1.

In the example shown, the scanner 10 is moved across a fixed memory layer 1. However, it goes without saying that the above designs are also applicable if the scanner 10 is fixed and the memory layer 1 situated on the base layer 2 is transported relative to it in the direction of movement P. The same applies analogously for refinements in which both the scanner 10 is moved in the transport direction T and the memory layer 1 is moved in the direction of movement P.

The exemplary embodiment of the system according to the invention shown in FIG. 1 comprises, in addition to the scanner 10 described, the memory layer 1 that is configured in such a way that components of the excited emission radiation 7 are partially absorbed by the medium in the memory layer 1 both perpendicularly to and parallel to the plane of the memory layer 1. This considerably reduces scattering of the excited emission radiation 7 inside the memory layer 1. This is explained in greater detail below by reference to FIGS. 2 and 3.

Figure 2:
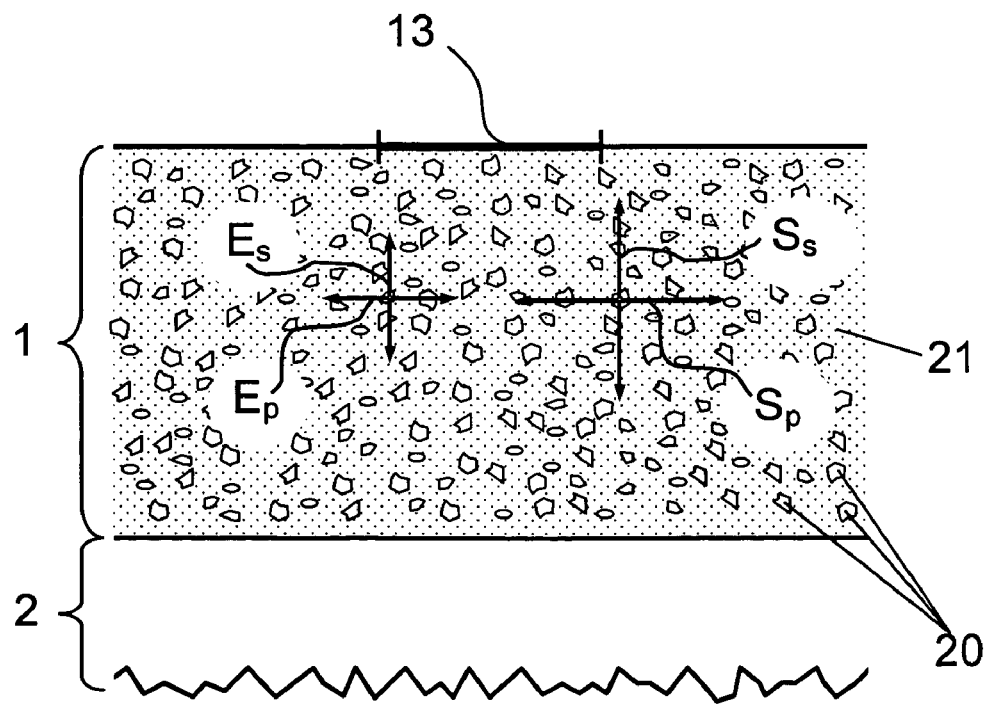
FIG. 2 shows an enlarged cross section through a memory layer according to the invention.

FIG. 2 shows an enlarged cross section through a memory layer 1 according to the invention in the region of the portion A shown in FIG. 1. The memory layer 1 situated on the base layer 2 comprises a multiplicity of individual particles 20 in which X-ray information items can be stored during a radiography process. The individual particles 20 generally have an irregular shape, in particular without preferred direction and symmetry axes.

Typical diameters of the individual particles 20 are between about 3 µm and 12 µm, in particular about 7 µm. The particles 20 are embedded in a medium 21 and are disposed so as to be distributed over the entire thickness of the memory layer 1. Since the particles 20 are generally present in the form of a powder that is blended with the medium 21 and is bound by the latter, this type of memory layer 1 is also described as a powder image plate (PIP). Typical thicknesses of such memory layers 1 are between 50 µm and 500 µm, in particular about 250 µm.

During the read-out of the X-ray information items stored in the individual particles 20 of the memory layer 1, the memory layer 1 is irradiated from its upper side with stimulating radiation that describes a stimulating radiation line 13, extending perpendicularly to the plane of FIG. 2, on the memory layer 1. The stimulating radiation partly penetrates the memory layer 1 and excites individual particles 20 to emit emission radiation. The emission radiation emitted by a particle 20 traverses the medium 21 until it strikes further particles 20 and are scattered at the latter. The scattered radiation is then scattered again at further particles, etc. As a result, a so-called build-up of the scattering of emission radiation takes place that results in a widening of the linear region to be read out, i.e. of the stimulating radiation line 13, and consequently in a loss in sharpness of the positional information.

According to the invention, this loss in sharpness is reduced as a result of the emission radiation being partially absorbed by the medium 21 situated between the individual particles 20 and consequently attenuated. Since the individual particles 20 are each completely surrounded by the medium 21 and the emission radiation emitted by an individual particle 20 generally has both components $E_S$ perpendicular to the plane of the memory layer 1 and components $E_P$ parallel to the plane of the memory layer 1, both the components $E_S$ and $E_P$ of the emission radiation are attenuated in the same way by the medium 21. As a result, the mean path length of the emission radiation emitted by individual particles 20 inside the memory layer 1 and, consequently, the build-up of the scattering of emission radiation is markedly reduced in all the spatial directions.

Preferably, the medium 21 contains a first dye that has high absorption coefficients in the blue-light range, in particular between 400 nm and 440 nm. The medium 21 preferably contains the first dye in the form of red-colored pigments. The red coloration of the medium 21 situated between the individual particles 20 achieves the result that the stimulating radiation normally situated in the red spectral range can penetrate the memory layer 1 and a build-up of the scattering of the emission radiation emitted by the individual particles 20, that is normally in the blue spectral range, is reduced. This ensures a sharp spatial limitation of the emission radiation to be detected accompanied by simultaneously higher emission intensity.

In addition to the scattering of emission radiation, the scattering of stimulating radiation inside the memory layer 1 also contributes to a blurring of the image information to be detected. In order to keep these contributions as low as possible, the medium 21 may additionally be configured in such a way that it can at least partially absorb components $S_S$ and $S_P$, respectively, directed both perpendicularly and parallel to the plane of the memory layer 1, of the stimulating radiation scattered at the particles 20 in the wavelength range of the stimulating radiation. Preferably, the medium 21 contains a second dye that has high absorption coefficients in the red-light range, in particular between 620 nm and 690 nm. This achieves an attenuation of the stimulating radiation inside the memory layer 1, which reduces a build-up of the scattering of the stimulating radiation and an associated blurring of the excited stimulating radiation line 13 on the memory layer 1. Preferably, the medium 21 contains the second dye in the form of blue colored pigments. Together with the first dye, which is likewise preferably present in the form of red-colored pigments, the attenuation of the emission radiation and the stimulating radiation can then be systematically adjusted independently of one another by the choice of the concentration of the respective colored pigments.

Figure 3:
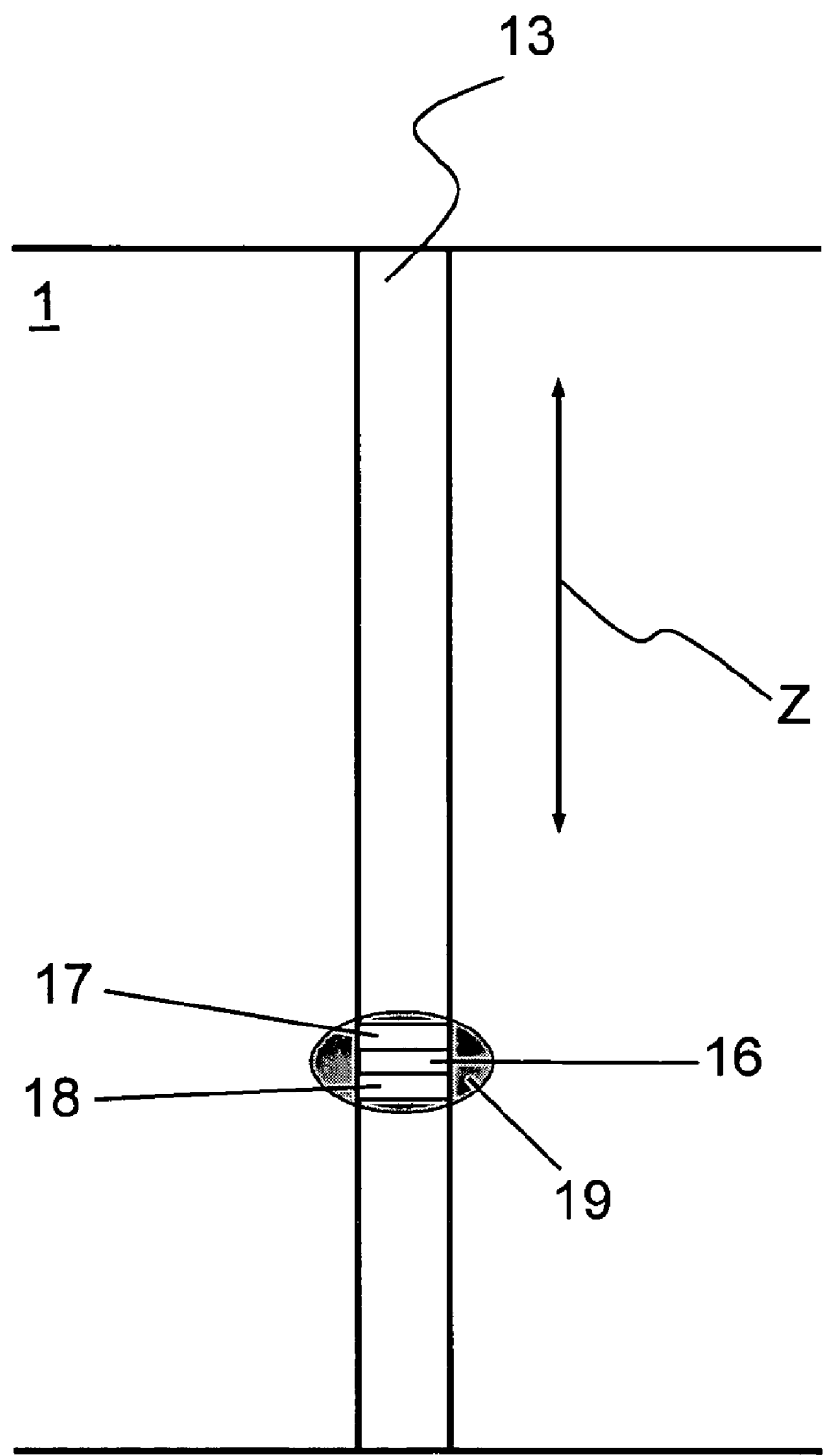
FIG. 3 shows a plan view of a memory layer according to the invention.

FIG. 3 shows a plan view of a memory layer 1 according to the invention in the region of the stimulating radiation line 13 shown in FIG. 1. For the purpose of better illustration, the stimulating radiation line 13 has been shown considerably widened compared with FIG. 1. The advantageous effect of the invention is explained below by way of example by reference to three sections 16 to 18 of the stimulating radiation line 13.

The entire stimulating radiation line 13 is irradiated with stimulating radiation so that each individual section 16 to 18 of the stimulating radiation line 13 is excited to emit emission radiation. Because of the scattering of the excited emission radiation in the memory layer 1, the emission radiation excited in each section 16 to 18 is emitted not only by the respective excited section 16, 17 or 18, but also by regions adjacent thereto. This has the result that the emission radiation excited, for example, in the region of the section 16 is also scattered in the adjacent regions in which the sections 17 and 18 are situated. This is indicated by the scattered radiation region 19 shown. The emission radiation leaving the respective sections 17 and 18 consequently also contains components of the emission radiation from section 16, which means a loss in sharpness of the image information detected since the image information detected does not originate only from sections 17 and 18. Similar remarks apply conversely to the influence of the scattered emission radiation of the sections 17 and 18 on section 16.

As already explained in greater detail above, the coloration according to the invention of the memory layer 1 with red dye results in a lower build-up of the scattering of the emission radiation in the memory layer 1. This reduces the scattered radiation region 19 of the excited section 16. The sharpness of the image information to be read out is thereby increased not only perpendicularly to the line direction Z of the stimulating radiation line 13, but also parallel to the line direction Z, i.e. in the adjacent sections 17 and 18 shown in the example.

A positionally resolved detection of the emission light leaving the stimulating radiation line 13 with a line scanner also detects the increase in the sharpness in both directions. The loss in intensity of the detected emission light to be expected owing to the red coloration of the memory layer 1 under these circumstances is surprisingly very low, with the result that a sufficiently high signal-to-noise ratio is also ensured, in addition to a better sharpness of the image information, in particular in the line direction Z.

Additional coloration of the memory layer 1 with a blue dye reduces, in addition, the scattering of stimulating radiation. In the case of a positionally resolved detection of the image information along the stimulating radiation line 13 with a line scanner, this contributes to a further increase in sharpness—in contrast to the red coloration, however, only perpendicularly to the line direction Z.

The invention claimed is:

1. A system comprising a scanner and a memory layer, in which the memory layer comprises a multiplicity of particles that
    are designed to store X-ray information items,
    can be excited by a stimulating radiation to emit an emission radiation corresponding to one of the X-ray information items, and
    are embedded in a medium and are distributed over an entire thickness of the memory layer,
    and in which the scanner comprises
    an irradiating device for irradiating a linear region on the memory layer with stimulating radiation and
    a detector for positionally resolved detection of the emission radiation emitted by the memory layer along the linear region,
    wherein the medium can at least partially absorb components, directed both perpendicularly and parallel to the plane of the memory layer, of the emission radiation that is emitted by the individual particles.

2. The system as claimed in claim 1, wherein the medium can at least partially absorb components of the emission radiation in a first wavelength range that lies in the blue-light range.

3. The system as claimed in claim 2, wherein the medium contains a first dye that can at least partially absorb the components of the emission radiation in the first wavelength range.

4. The system as claimed in claim 3, wherein the medium contains the first dye in the form of red colored pigments.

5. The system as claimed in claim 1, wherein the medium can at least partially absorb components, directed both perpendicularly and parallel to the plane of the memory layer, of the stimulating radiation in a second wavelength range in which the particles can be excited to emit emission radiation.

6. The system as claimed in claim 5, wherein the second wavelength range lies in the red-light range.

7. The system as claimed in claim 6, wherein the medium contains a second dye that can at least partially absorb the components of the stimulating radiation in the second wavelength range.

8. The system as claimed in claim 7, wherein the medium contains the second dye in the form of blue colored pigments.

9. The system as claimed in claim 1, wherein the irradiating device comprises a plurality of individual radiation sources and a focusing device, the individual radiation sources each emitting stimulating radiation beams that are focused by the focusing device on the linear region of the memory layer and are at least partially superimposed on the linear region.

10. The system as claimed in claim 9, wherein the focusing device comprises at least one cylindrical lens or one cylindrical mirror.

11. The system as claimed in claim 1, wherein the detector comprises a multiplicity of photosensitive detector elements disposed in a row.

12. The system as claimed in claim 1, wherein an imaging device is provided that images the emission radiation leaving the linear region in the memory layer on the detector.

13. The system as claimed in claim 12, wherein the imaging device comprises a multiplicity of microlenses disposed in a row.

14. The system as claimed in claim 1, wherein the irradiating device is disposed ahead of the detector with respect to a transport direction in which the scanner is moved relative to the memory layer.

15. A memory layer for storing X-ray information items and comprising a multiplicity of particles that
   are designed to store X-ray information items,
   can be excited by a stimulating radiation to emit an emission radiation corresponding to one of the X-ray information items and
   are embedded in a medium and are distributed over an entire thickness of the memory layer,
   wherein the medium can at least partially absorb components, directed both perpendicularly and parallel to the plane of the memory layer, of the emission radiation that is emitted by the individual particles.

16. The memory layer as claimed in claim 15, wherein the medium can at least partially absorb the components of the emission radiation in a first wavelength range that lies in the blue-light range.

17. The memory layer as claimed in claim 16, wherein the medium contains a first dye that can at least partially absorb the components of the emission radiation in the first wavelength range.

18. The memory layer as claimed in claim 17, wherein the medium contains the first dye in the form of red colored pigments.

19. The memory layer as claimed in claim 15, wherein the medium can at least partially absorb components, directed both perpendicularly and parallel to the plane of the memory layer, of the stimulating radiation in a second wavelength range in which the particles can be excited to emit the emission radiation.

20. The memory layer as claimed in claim 19, wherein the second wavelength range lies in the red-light region.

21. The memory layer as claimed in claim 20, wherein the medium contains a second dye that can at least partially absorb the components of the stimulating radiation in the second wavelength range.

22. The memory layer as claimed in claim 21, wherein the medium contains the second dye in the form of blue colored pigments.

23. A system for storing and reading out X-ray information, comprising:
   a planar memory layer including: a medium, and phosphor particles, distributed within the medium, that store an X-ray image;
   a scanner including: an irradiation device that irradiates the phosphor particles of the memory layer with stimulating radiation to induce generation of emission radiation indicative of the stored X-ray image, and a detector for detecting the emission radiation from the phosphor particles;
   wherein the memory layer further includes a dye distributed between and on all sides of the phosphor particles in the medium, the dye being absorbing to the emission radiation to attenuate the emission radiation both in a direction parallel to the memory layer and in a direction perpendicular to the memory layer.

24. The system as claimed in claim 23, wherein the emission radiation is blue and dye absorbs blue light.

25. The system as claimed in claim 23, wherein the dye comprises red colored pigments.

26. The system as claimed in claim 23, wherein the memory layer further includes a dye that absorbs the stimulating radiation.

27. The system as claimed in claim 26, wherein the dye that absorbs the stimulating radiation comprises blue colored pigments.

28. The system as claimed in claim 23, wherein the irradiation device comprises a plurality of individual radiation sources and a focusing device, the individual radiation sources each emitting stimulating radiation beams that are focused by the focusing device onto a linear region of the memory layer.

29. The system as claimed in claim 28, wherein the detector comprises a linear array of photosensitive detector elements.

30. The system as claimed in claim 29, wherein the irradiating device is disposed ahead of the detector with respect to a transport direction in which the scanner is moved relative to the memory layer.

* * * * *